(12) United States Patent
Bondi et al.

(10) Patent No.: US 7,484,128 B2
(45) Date of Patent: Jan. 27, 2009

(54) INDUCING DIVERSITY IN REPLICATED SYSTEMS WITH SOFTWARE REJUVENATION

(75) Inventors: Andre B. Bondi, Red Bank, NJ (US); Alberto Avritzer, Mountainside, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 582 days.

(21) Appl. No.: 11/312,973

(22) Filed: Dec. 20, 2005

(65) Prior Publication Data

US 2006/0156299 A1    Jul. 13, 2006

Related U.S. Application Data

(60) Provisional application No. 60/642,917, filed on Jan. 11, 2005.

(51) Int. Cl.
*G06F 11/00* (2006.01)
(52) U.S. Cl. .......................................... 714/38; 714/47
(58) Field of Classification Search ................... 714/38, 714/47
See application file for complete search history.

(56) References Cited

U.S. PATENT DOCUMENTS

| | | | |
|---|---|---|---|
| 5,715,386 A | 2/1998 | Fulton, III et al. | |
| 6,026,391 A * | 2/2000 | Osborn et al. | 707/2 |
| 6,216,237 B1 | 4/2001 | Klemm et al. | |
| 6,457,143 B1 * | 9/2002 | Yue | 714/43 |
| 6,594,784 B1 | 7/2003 | Harper et al. | |
| 6,629,266 B1 | 9/2003 | Harper et al. | |
| 6,725,272 B1 * | 4/2004 | Susai et al. | 709/229 |
| 6,810,495 B2 | 10/2004 | Castelli et al. | |
| 6,857,086 B2 * | 2/2005 | Shaw | 714/55 |
| 7,055,063 B2 * | 5/2006 | Leymann et al. | 714/16 |
| 7,100,079 B2 * | 8/2006 | Gross et al. | 714/23 |
| 7,328,127 B2 * | 2/2008 | Otsuka et al. | 702/182 |

(Continued)

OTHER PUBLICATIONS

Tadashi Dohi, et al., "Statistical Non-Parametric Algorithms To Estimate The Optimal Software Rejuvenation Schedule", 2000.

(Continued)

*Primary Examiner*—Marc Duncan

(57) ABSTRACT

A computer-implemented method for triggering a software rejuvenation system or method in a computer-system including a plurality of replicates includes receiving a request for resources at a first replicate, determining an estimated response time to the request for resources, and determining that the estimated response time is greater than a first threshold. The method further includes determining that a number of estimated response times greater than the first threshold is greater than or equal to a second threshold, wherein the second threshold of the first replicate is different than a second threshold of a second replicate of the computer-system, and triggering the software rejuvenation system or method for the first replicate.

17 Claims, 4 Drawing Sheets

U.S. PATENT DOCUMENTS

| | | |
|---|---|---|
| 2002/0087612 A1 | 7/2002 | Harper et al. |
| 2002/0087913 A1 | 7/2002 | Harper et al. |
| 2002/0144178 A1 | 10/2002 | Castelli et al. |
| 2003/0023719 A1 | 1/2003 | Castelli et al. |
| 2003/0036882 A1 | 2/2003 | Harper et al. |
| 2003/0037288 A1 | 2/2003 | Harper et al. |
| 2003/0079154 A1 | 4/2003 | Park et al. |
| 2004/0078657 A1 | 4/2004 | Gross et al. |
| 2004/0088580 A1 | 5/2004 | Cabrera et al. |
| 2004/0213361 A1 | 10/2004 | Chen et al. |
| 2006/0085685 A1* | 4/2006 | Cheston et al. ............... 714/38 |
| 2006/0129367 A1* | 6/2006 | Mishra et al. ................. 703/13 |

OTHER PUBLICATIONS

Andras Pfening, et al., "Optimal Software Rejuvenation For Tolerating Soft Failures" pp. 1-19, 1996.

Sachin Garg, et al., "Minimizing Completion Time of a Program By Checkpointing and Rejuvenation", 1996.

* cited by examiner

INDUCING DIVERSITY IN REPLICATED SYSTEMS WITH SOFTWARE REJUVENATION

This application claims priority to U.S. Provisional Application Ser. No. 60/642,917, filed on Jan. 11, 2005, which is herein incorporated by reference in its entirety.

BACKGROUND OF THE INVENTION

1. Technical Field

The present invention relates to software rejuvenation, and more particularly to a system and method for tuning a software rejuvenation method using a customer affecting performance metric.

2. Discussion of Related Art

Replication of components is often used to preserve continuity of service in web-based systems, telecommunication systems, and other systems needing a high degree of reliability. Replication improves performance by allowing the load to be spread among multiple servers. When paired replicates are engineered so that the peak load does not cause the utilization of any resource on any of them to exceed a threshold, e.g., 40%, replication increases reliability by allowing each replicate to act as a standby for the other while maintaining acceptable service. If the offered load is balanced among replicated servers that are programmed identically, which is the case with clusters of web server platforms such as those supported by WebSphere™ and WebLogic™, faults that are consequences of software aging are likely to occur in all replicates at about the same time if they are booted or rejuvenated at the same time. If the parameters governing rejuvenation are substantially identical in all replicates, a traffic-based method of rejuvenating aging software will be triggered on all of them at about the same time. This undermines service continuity.

Large industrial software systems need extensive monitoring and management to deliver expected performance and reliability. Some specific types of software failures, called soft failures, have been shown to leave the system in a degraded mode, where the system is still operational, but the available system capacity has been greatly reduced. Examples of soft bugs have been documented in several software studies. Soft failures can be caused by the evolution of the state of one or more software data structures causing performance degradation. This performance degradation is called software aging. Software aging has been observed in widely used software. An approach for system capacity restoration for telecommunications systems that took advantage of the cyclical nature of telecommunications traffic was proposed. Telecommunications operating companies understand the traffic patterns in their networks well, and therefore can plan to restore their smoothly degrading systems to full capacity in the same way they plan their other maintenance activities. Experience has demonstrated that soft bugs occur as a result of problems with synchronization mechanisms, e.g., semaphores; kernel structures, e.g., file table allocations; database management systems, e.g., database lock deadlocks; and other resource allocation mechanisms that are essential to the proper operation of large multi-layer distributed systems. Since some of these resources are designed with self-healing mechanisms, e.g., timeouts, some systems may recover from soft bugs after a period of time. For example, for a specific Java based e-commerce system, when the soft bug was revealed, users were complaining of very slow response time for periods exceeding one hour, after which the problem would clear by itself.

If all parameter settings in all copies of a replicate are equal, all replicates of a system are likely to undergo rejuvenation at about the same time. This diminishes the utility of having replicates.

Therefore, a need exists for a system and method for software rejuvenation triggered on different servers at different times.

SUMMARY OF THE INVENTION

A method for identifying and correcting the performance degradation attributable to software aging tracks and responds to the changing-values of customer-affecting metrics, so that software rejuvenation is triggered on different servers at different times.

According to an embodiment of the present disclosure, a computer-implemented method for triggering a software rejuvenation system or method in a computer-system comprising a plurality of replicates includes receiving a request for resources at a first replicate, determining an estimated response time to the request for resources, and determining that the estimated response time is greater than a first threshold. The method further includes determining that a number of estimated response times greater than the first threshold is greater than or equal to a second threshold, wherein the second threshold of the first replicate is different than the second threshold of a second replicate of the computer-system, and triggering the software rejuvenation system or method for the first replicate.

Determining the estimated response time comprises sampling a plurality of response times, and determining an average response time, wherein the average response time is used as the estimated response time.

The first threshold varies according to a number of estimated response times greater than the first threshold. The method includes increasing the first threshold with the number of response times greater than the first threshold.

The second threshold is a positive integer. The method includes varying the second threshold of the first replicate upon triggering the software rejuvenation system or method for the first replicate.

According to an embodiment of the present disclosure, a computer-implemented method for triggering a software rejuvenation system or method in a computer-system comprising a plurality of replicates includes receiving a request for resources at a first replicate, determining a response time to the request for resources, and increasing a number of response times greater than a first threshold upon determining that the response time is greater than the first threshold. The method further includes decreasing the number of response times greater than the first threshold upon determining that the response time is less than the first threshold, determining that the number of response times greater than the first threshold is greater than or equal to a second threshold, wherein the second threshold of the first replicate is different than the second threshold of a second replicate of the computer-system, and triggering the software rejuvenation system or method for the first replicate.

The method includes increasing the first threshold by a number of standard deviations upon determining the number of response times greater than the first threshold is greater than D, wherein the first threshold can be increased K standard deviations, and wherein K and D are the same or different positive integers, and the second threshold is K multiplied by D, wherein values of K and D differ for each the first and the second replicate.

The method includes decreasing the first threshold by a number of standard deviations upon determining the number of response times greater than the first threshold is less than D, wherein the first threshold can be decreased K standard deviations, and wherein K and D are the same or different positive integers, and the second threshold is K multiplied by D, wherein values of K and D differ for each the first and the second replicate.

The request for resources may be generated by a client. The request for resources may be generated by a load injector.

The method includes initializing with the number of response times greater than the first threshold at zero and the first threshold set at a lowest level.

The method includes varying the second threshold of the first replicate upon triggering the software rejuvenation system or method for the first replicate.

According to an embodiment of the present disclosure, a program storage device is provided readable by machine, tangibly embodying a program of instructions executable by the machine to perform method steps for triggering a software rejuvenation system or method in a computer-system comprising a plurality of replicates. The method includes receiving a request for resources at a first replicate, determining an estimated response time to the request for resources, and determining that the estimated response time is greater than a first threshold. The method further includes determining that a number of estimated response times greater than the first threshold is greater than or equal to a second threshold, wherein the second threshold of the first replicate is different than the second threshold of a second replicate of the computer-system, and triggering the software rejuvenation system or method for the first replicate.

According to an embodiment of the present disclosure, a program storage device is provided readable by machine, tangibly embodying a program of instructions executable by the machine to perform method steps for triggering a software rejuvenation system or method in a computer-system comprising a plurality of replicates. The method includes receiving a request for resources at a first replicate, determining a response time to the request for resources, and increasing a number of response times greater than a first threshold upon determining that the response time is greater than the first threshold. The method further includes decreasing the number of response times greater than the first threshold upon determining that the response time is less than the first threshold, determining that the number of response times greater than the first threshold is greater than or equal to a second threshold, wherein the second threshold of the first replicate is different than the second threshold of a second replicate of the computer-system, and triggering the software rejuvenation system or method for the first replicate.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
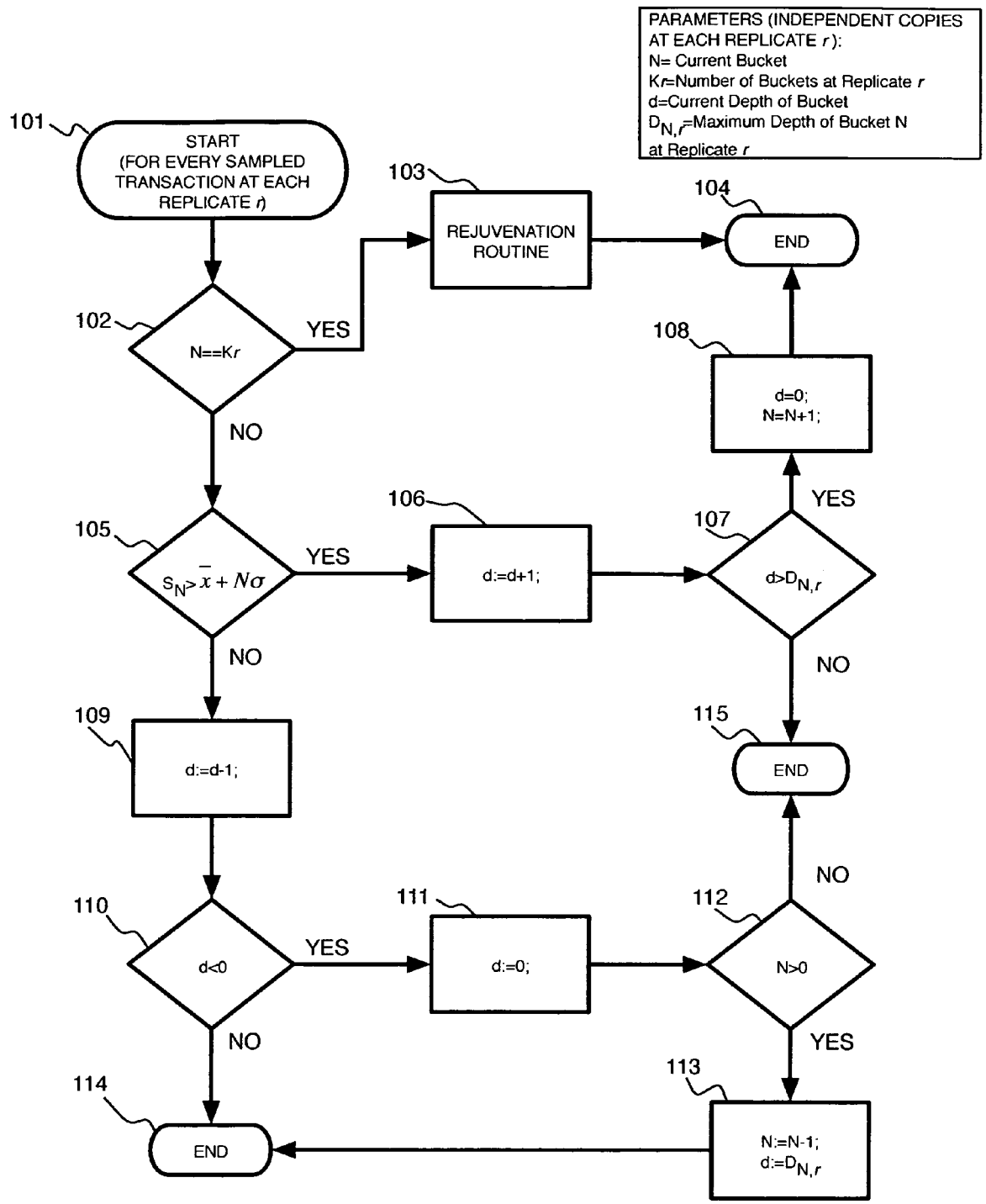
FIG. 1 is a diagram of a system according to an embodiment of the present disclosure.

A software rejuvenation event is a pre-emptive restart of a running application or system to prevent future failures. The restart may terminate all threads in execution and release all resources associated with the threads. The software rejuvenation event may include additional activities, such as a backup routine or garbage collection.

According to an embodiment of the present disclosure, a method triggers software rejuvenation events at different times in different instances of a replicated system. This allows load to be shifted from the instance undergoing software rejuvenation to another instance. The method is needed in systems with load balancing among replicates, because instances that are rejuvenated or initialized simultaneously are likely to need subsequent rejuvenation simultaneously. The method reduces the likelihood of simultaneous rejuvenation of all instances by causing rejuvenation triggers to occur at different times.

Parameters of the mechanism triggering software rejuvenation are set to different values on different servers for triggering rejuvenations at different times. This promotes service continuity in clustered systems. In systems without a rejuvenation mechanism, servers are likely to fail. In systems with identically configured software rejuvenation mechanisms, all of them are likely to be rejuvenated concurrently if the load is well balanced among them.

According to an embodiment of the present disclosure, a method distinguishes between performance degradation due to a burst of arrivals and performance degradation due to increased service time as a result of system capacity degradation. If the system is operating at full capacity and a short burst of arrivals is presented, there should be no benefit in executing the preventive maintenance routine. However, if system capacity has been degraded to such an extent that users are effectively locked out of the system, preventive maintenance may be warranted.

According to an embodiment of the present disclosure, the customer affecting metric of performance, for example, a response time, can be sampled frequently (e.g., if a Bernoulli parameter p, between 0 and 1 is defined, a fraction p of each transaction would be sampled), and that the first and second moments of the metric when the system is operating at full capacity can be estimated before a monitoring tool is deployed in production. Sampling can be performed using, for example, the monitoring tool or load injectors, deployed at customer sites. Load injectors create virtual users who take the place of real users operating client software. The monitoring tool may collect response times at various infrastructure components. Transaction requests from one or more virtual user clients may be generated by the load injectors to create a load on one or more replicates under test. Thus, an accurate estimate of the average transaction response time request can be determined.

The following strategy is applied to the $r^{th}$ replicate in a cluster of otherwise substantially identical servers or other substantially identical programs executing in parallel.

Whenever a transaction terminates processing, the value of the customer affecting metric is estimated by counting the recent number of occurrences d of sample values that are greater than $\bar{x}+N\sigma$, where $\bar{x}$ is the reference average expected value of the metric, $N$ (=0, 1, 2, ..., $K_r$) is the index to the current bucket, and $\sigma$ is the reference expected standard deviation of the customer-affecting metric. $K_r$ represents the total number of buckets used for the method in the $r^{th}$ replicate, r=0, 1, 2, ..., R-1. $D_{N,r}$ represents the depth of the $N^{th}$ bucket within replicate r. If the last available bucket $K_r$ overflows, the rejuvenation routine is executed. The levels of $K_r$ contiguous buckets are tracked at replicate r. At any given time, the level of d of only the $N^{th}$ bucket is considered within the $r^{th}$ replicate. N is incremented when the current bucket overflows, when d first exceeds $D_{N,r}$, and is decremented when the current bucket is emptied, when d next takes the value zero.

The method operates on each replicate independently of the others. Each replicate has its own buckets and its own instances of variables d and N. According to an embodiment of the present disclosure, diversity is achieved by ensuring that $D_{N,i} \neq D_{N,j}$ for $i \neq j$. In particular, if $D_{N,i} < D_{N,j}$ for $0 \leq i < j < R$ and $K_r = K$ for $0 \leq r < R$, rejuvenation is more likely to take place earlier at the $i^{th}$ replicate than at the $j^{th}$ replicate. To reduce the risk that the $i^{th}$ replicate will be rejuvenated more often than the $j^{th}$ replicate, for $i<j$, the $i^{th}$ replicate can be rejuvenated with the bucket depths set to the values $\{D_{N,i+1}\}$, where addition in the second subscript is modulo R.

Referring to FIG. 1, a current average delay is estimated, wherein the replica index is denoted by r (r=0, 1, 2, ..., R−1). Denote the bucket index by d (d=0, 1, 2, ..., $K_r$).

Within each replicate, e.g., server or application program, r and N are local variables.

1. if ($N==K_r$) 102 execute the rejuvenation routine 103 and update the values of $\{D_{b,r}\}$ and {END} 104
2. if (the sampled customer affecting metric is greater than $\bar{x}+N\sigma$) 105
   then
      do {d:=d+1;} 106
   else
      do {d:=d−1;} 109
3. If ($d > D_{N,r}$) 107
   do {d:=0; N=N+1} 108 and {END} 104
4. If ((d<0) 110 AND (N>0) 112
   then
      do {d:=$D_{N,r}$; N:=N−1;} 113 and {END} 114
5. If ((d<0) 110 AND (N==0) 112)
   then
      do {d:=0;} 111 and {END} 115

Diversification of the responsiveness to traffic conditions is achieved by having the bucket depth $D_{N,r}$ and the number of buckets $K_r$ depend on the replicate index r. The method is initialized at system startup 101 and at rejuvenation 103 with d=0; N=0. The method models $K_r$ contiguous buckets. A ball is dropped into the current bucket 108 if the measured delay exceeds the expected value of the customer affecting metric 107. A ball is removed from the current bucket 113 if the measured delay is smaller than the expected value of the customer affecting metric 110 and 112.

Figure 2:
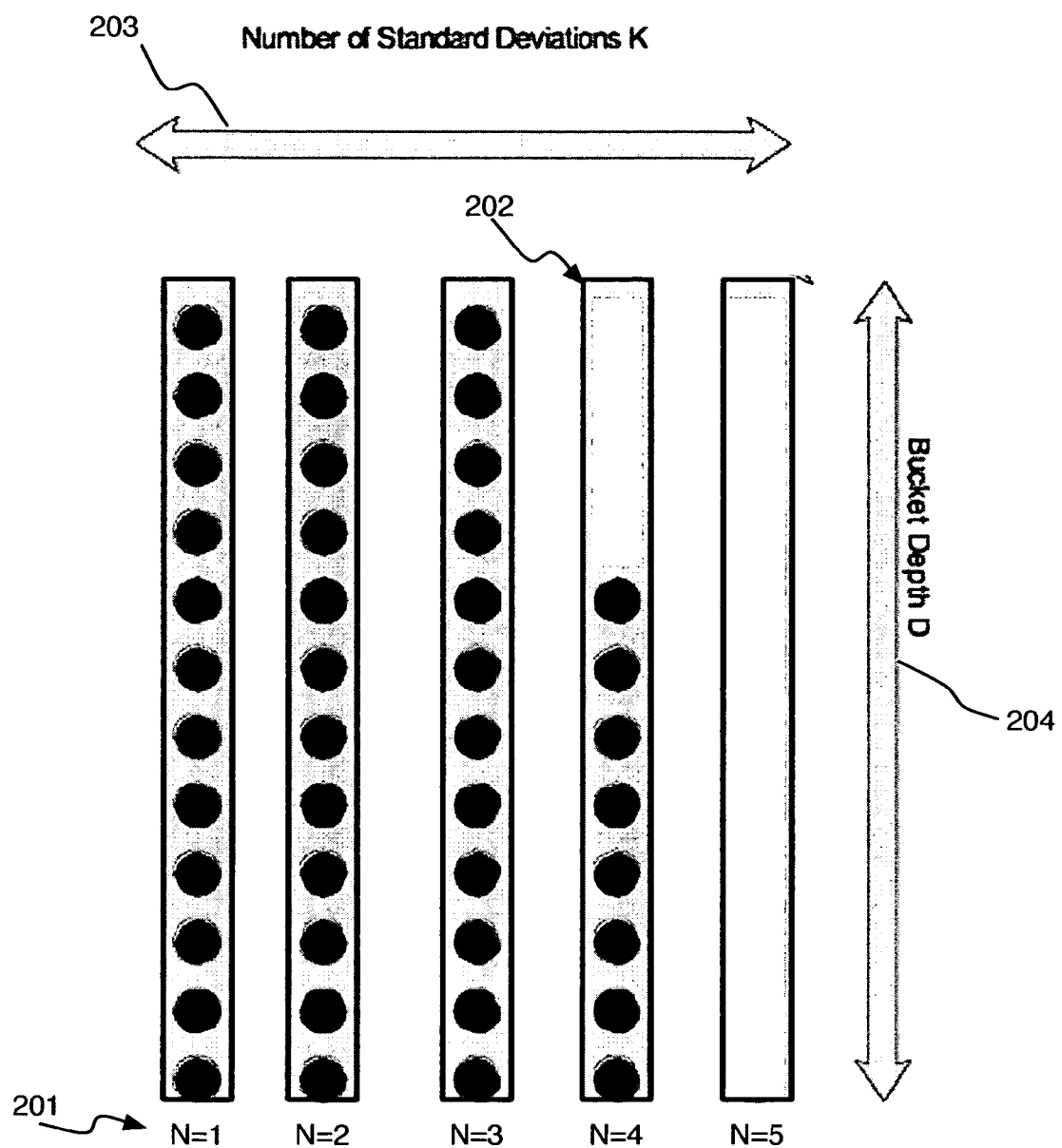
FIG. 2 is an illustration of a user-interface (e.g., a use-case) according to an embodiment of the present disclosure.
Figure 3:
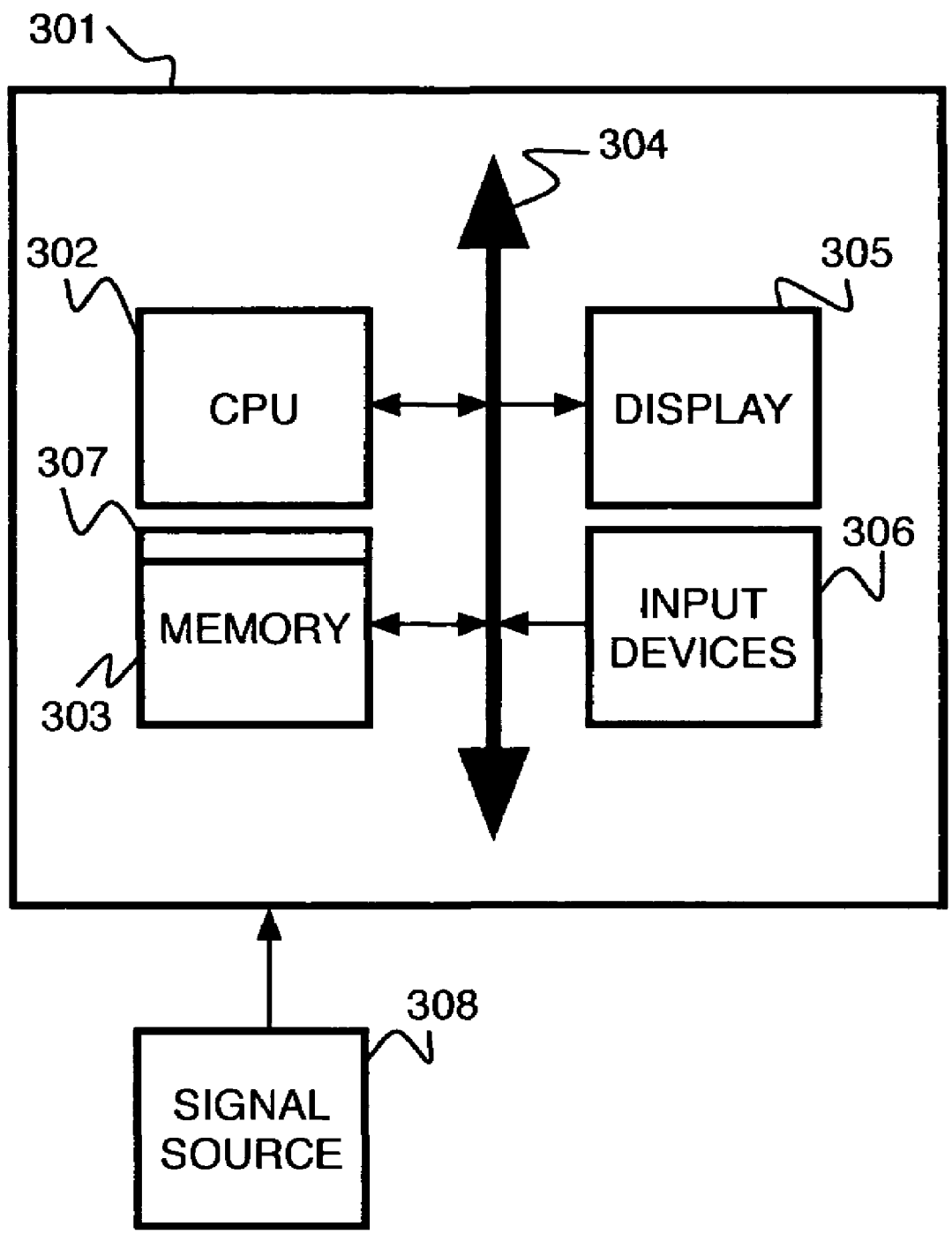
FIG. 3 is a diagram of a system according to an embodiment of the present disclosure.

When the current bucket overflows 105, the method changes its estimation of the expected delay by adding one standard deviation to the expected value of the metric 106, moving to the next bucket. If a bucket underflows 105 the method subtracts one standard deviation from its estimation of the expected delay 109 moving to the previous bucket. Referring to FIG. 3, N represents the current bucket index 201; in the example shown in FIG. 2 N=4. d represents the number of balls stored in the current bucket 202; in the example 8 balls are currently in bucket 4. The monitoring system architect or administrator can tune the method's resilience to a burst of arrivals by changing the value of $D_{N,r}$ 204. The method's resilience to degradation in the customer affecting metric is adjusted by tuning the value of K 203. K represents the number of standard deviations from the mean that would be tolerated before the software rejuvenation routine is activated.

Referring to the diverse timing of rejuvenation events: Within each replicate, e.g., each iteration of the method of FIG. 1, the method delivers good baseline performance at low loads because it is activated when the customer affecting metric exceeds the target. This improved performance is achieved by using multiple contiguous buckets to track bursts in the arrival process and a bucket depth to validate the moments where the estimate of the performance metric should be changed. With good load balancing, rejuvenations at the replicates are likely to occur at distinct times, because the expected times taken to fill and empty buckets at each replicate will vary from one replicate to the next. The replica index (r=0, 1, 2, ..., R−1) is a value assigned to each replica, for example, as assigned by an administrator, assigned automatically among replicates, etc.

The method is extensible, allowing for deviations whose magnitude varies with N, the index of the current bucket, by setting the current deviation to $\bar{x}+\alpha_{N,r}\sigma$ for some set of coefficients $\alpha_{N,r}$. The method may be extended to allow the bucket depths to be set dynamically. Different rules for updating the bucket depths can be used to ensure that the sets of bucket depths at different nodes are different.

A method according to an embodiment of the present disclosure may be implemented to monitor the relevant customer affecting metrics in a product and to trigger software rejuvenation whence the estimate of the customer affecting metric exceeds a specified target, at different times in different replicates within a cluster.

It should be noted that throughout the specification, embodiments have been described using the terms "bucket" and "ball". These terms are analogous to any method for counting the occurrences of an event. For example, in computer science, consider an element of an array as a bucket, wherein the array is K elements (e.g., buckets) long and each element stores a number representing a number of times an event has occurred (e.g., balls). One of ordinary skill in the art would appreciate that other methods of tracking a customer-affecting metric are possible.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Referring to FIG. 3, according to an embodiment of the present invention, a computer system 301 for implementing a method for software rejuvenation can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the CPU 302 to process the signal from the signal source 308. As such, the computer system 301 is a general-purpose computer system that becomes a specific purpose computer system when executing the routine 307 of the present invention.

The computer platform 301 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 4:
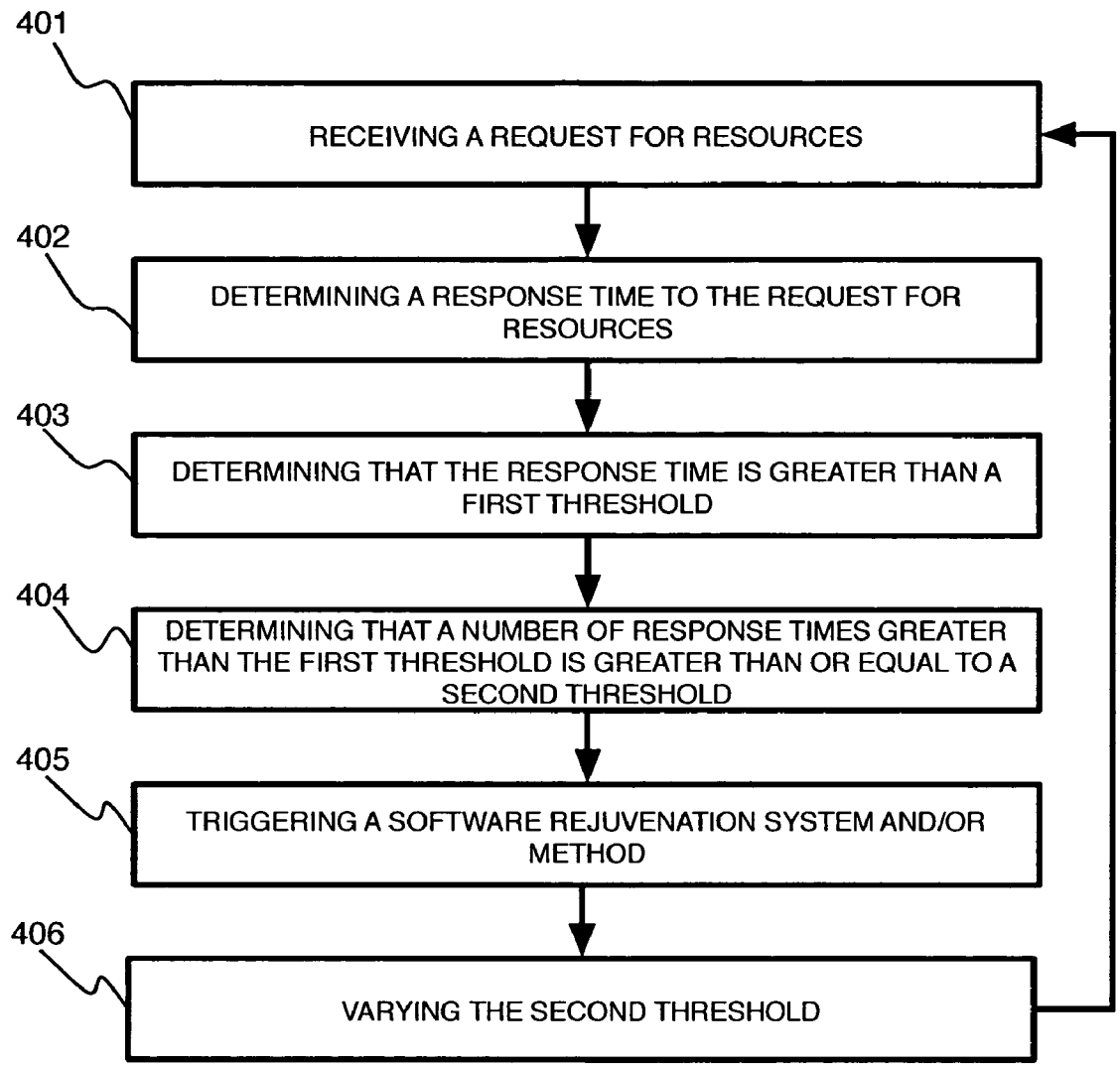
FIG. 4 is a flow chart of a method according to an embodiment of the present disclosure.

Referring to FIG. 4, according to an embodiment of the present disclosure, a method for triggering a software rejuvenation system and/or method includes receiving a request for resources 401, determining a response time to the request for resources 402, determining that the response time is greater than a first threshold 403, determining that a number of response times greater than the first threshold is greater than a second threshold 404, wherein the second threshold is dependent upon an index of a current replicate, and triggering the software rejuvenation system and/or method 405. The second threshold of the current replicate may be varied after each rejuvenation event 406. A response time is an example of a customer-affecting metric, other metrics may be used, for example, a number of page-not-found errors received by a client (e.g., add a ball to a bucket upon receiving a page-not-found error and subtract a ball from the bucket upon receiving a valid response).

Having described embodiments for a system and method for software rejuvenation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for triggering a software rejuvenation system or method in a computer-system comprising a plurality of replicates comprising:
   receiving a request for resources at a first replicate;
   determining an estimated response time to the request for resources;
   determining that the estimated response time is greater than a first threshold;
   determining that a number of estimated response times greater than the first threshold is greater than or equal to a second threshold, wherein the second threshold of the first replicate is different than the second threshold of a second replicate of the computer-system; and
   triggering the software rejuvenation system or method for the first replicate.

2. The computer-implemented method of claim 1, wherein determining the estimated response time comprises:
   sampling a plurality of response times; and
   determining an average response time, wherein the average response time is used as the estimated response time.

3. The computer-implemented method of claim 1, wherein the first threshold varies according to a number of estimated response times greater than the first threshold.

4. The computer-implemented method of claim 3, further comprising increasing the first threshold with the number of response times greater than the first threshold.

5. The computer-implemented method of claim 1, wherein the second threshold is a positive integer.

6. The computer-implemented method of claim 1, further comprising varying the second threshold of the first replicate upon triggering the software rejuvenation system or method for the first replicate.

7. A computer-implemented method for triggering a software rejuvenation system or method in a computer-system comprising a plurality of replicates comprising:
   receiving a request for resources at a first replicate;
   determining a response time to the request for resources;
   increasing a number of response times greater than a first threshold upon determining that the response time is greater than the first threshold;
   decreasing the number of response times greater than the first threshold upon determining that the response time is less than the first threshold;
   determining that the number of response times greater than the first threshold is greater than or equal to a second threshold, wherein the second threshold of the first replicate is different than the second threshold of a second replicate of the computer-system; and
   triggering the software rejuvenation system or method for the first replicate.

8. The computer-implemented method of claim 7, further comprising increasing the first threshold by a number of standard deviations upon determining the number of response times greater than the first threshold is greater than D, wherein the first threshold can be increased K standard deviations, and wherein K and D are the same or different positive integers, and the second threshold is K multiplied by D, wherein values of K and D differ for each the first and the second replicate.

9. The computer-implemented method of claim 7, further comprising decreasing the first threshold by a number of standard deviations upon determining the number of response times greater than the first threshold is less than D, wherein the first threshold can be decreased K standard deviations, and wherein K and D are the same or different positive integers, and the second threshold is K multiplied by D, wherein values of K and D differ for each the first and the second replicate.

10. The computer-implemented method of claim 7, wherein the request for resources is generated by a client.

11. The computer-implemented method of claim 7, wherein the request for resources is generated by a load injector.

12. The computer-implemented method of claim 7, further comprising initializing with the number of response times greater than the first threshold at zero and the first threshold set at a lowest level.

13. The computer-implemented method of claim 7, further comprising varying the second threshold of the first replicate upon triggering the software rejuvenation system or method for the first replicate.

14. A program storage device readable by machine, tangibly embodying a program of instructions executable by the machine to perform method steps for triggering a software rejuvenation system or method in a computer-system comprising a plurality of replicates, the method steps comprising:
   receiving a request for resources at a first replicate;
   determining an estimated response time to the request for resources;

determining that the estimated response time is greater than a first threshold;

determining that a number of estimated response times greater than the first threshold is greater than or equal to a second threshold, wherein the second threshold of the first replicate is different than the second threshold of a second replicate of the computer-system; and triggering the software rejuvenation system or method for the first replicate.

15. The method of claim 14, further comprising varying the second threshold of the first replicate upon triggering the software rejuvenation system or method for the first replicate.

16. A program storage device readable by machine, tangibly embodying a program of instructions executable by the machine to perform method steps for triggering a software rejuvenation system or method in a computer-system comprising a plurality of replicates, the method steps comprising:

receiving a request for resources at a first replicate;

determining a response time to the request for resources;

increasing a number of response times greater than a first threshold upon determining that the response time is greater than the first threshold;

decreasing the number of response times greater than the first threshold upon determining that the response time is less than the first threshold;

determining that the number of response times greater than the first threshold is greater than or equal to a second threshold, wherein the second threshold of the first replicate is different than the second threshold of a second replicate of the computer-system; and triggering the software rejuvenation system or method for the first replicate.

17. The method of claim 16, further comprising varying the second threshold of the first replicate upon triggering the software rejuvenation system or method for the first replicate.

* * * * *